US006491328B1

(12) United States Patent
Dreisbach

(10) Patent No.: US 6,491,328 B1
(45) Date of Patent: Dec. 10, 2002

(54) BIN SEAL AND FASTENER

(75) Inventor: Richard C. Dreisbach, North Arlington, NJ (US)

(73) Assignee: E. J. Brooks Company, Livingston, NJ (US)

(*) Notice: Subject to any disclaimer, the term of this patent is extended or adjusted under 35 U.S.C. 154(b) by 0 days.

(21) Appl. No.: 09/523,325

(22) Filed: Mar. 10, 2000

(51) Int. Cl.[7] .............................................. B65D 27/30

(52) U.S. Cl. ....................... 292/322; 292/307; 292/328; 411/2; 411/3; 411/5; 403/2

(58) Field of Search ................................ 292/307, 318, 292/319, 320, 322, 328, 270, 282, 284, DIG. 11, DIG. 34, DIG. 38, DIG. 50; 403/2, 315, 316; 411/2, 3, 5

(56) References Cited

U.S. PATENT DOCUMENTS

| | | | | |
|---|---|---|---|---|
| 2,159,363 A | | 5/1939 | Chaffee | |
| 3,074,134 A | | 1/1963 | Buechler | |
| 3,417,438 A | | 12/1968 | Schuplin | |
| 3,449,799 A | | 6/1969 | Bien | |
| 3,897,162 A | | 7/1975 | Havark | |
| 3,954,295 A | | 5/1976 | Harley | |
| 4,031,722 A | | 6/1977 | Michelman et al. | |
| 4,075,742 A | | 2/1978 | Remark et al. | |
| 4,318,650 A | | 3/1982 | LLauge | |
| 4,664,432 A | | 5/1987 | Swift | |
| 4,722,562 A | | 2/1988 | Burt | |
| 4,920,618 A | | 5/1990 | Iguchi | |
| 5,040,834 A | * | 8/1991 | Kahl et al. | 292/204 |
| 5,116,091 A | | 5/1992 | Swift | |
| 5,120,097 A | | 6/1992 | Fattori et al. | |
| 5,193,706 A | * | 3/1993 | Hanna et al. | 220/324 |
| 5,315,849 A | | 5/1994 | Georgopoulos | |
| 5,337,503 A | | 8/1994 | Goby | |
| 5,375,954 A | | 12/1994 | Eguchi | |
| 5,378,030 A | | 1/1995 | Georgopoulos et al. | |
| 5,464,115 A | * | 11/1995 | Tisbo et al. | 220/324 |
| 5,509,182 A | | 4/1996 | Nakanishi | |
| 5,524,945 A | | 6/1996 | Georgopoulos et al. | |
| 5,568,675 A | | 10/1996 | Asami et al. | |
| 5,702,135 A | * | 12/1997 | Burress | 292/145 |
| 5,775,860 A | | 7/1998 | Meyer | |
| 5,846,039 A | | 12/1998 | Kirchen et al. | |

FOREIGN PATENT DOCUMENTS

| | | |
|---|---|---|
| EP | 0 610 904 | 2/1994 |

* cited by examiner

*Primary Examiner*—Robert J. Sandy
*Assistant Examiner*—André Jackson
(74) *Attorney, Agent, or Firm*—Carella, Byrne, Bain, Gilfillan, et al; John G. Gilfillan, III; William Squire

(57) ABSTRACT

A robust rigid block forming a fastener and tamper evident seal attaches a cover to a tote bin. The seal is formed partially into a C-shaped locking device for insertion into aligned bores in the tote bin cover and bin. The C-shaped device is inserted to an insertion position and then displaced to a locking position with the legs of the device overlying the cover and bin members at the bores fastening the cover to the bin and capable of withstanding high shock loads. A locking element connected to the device by a frangible web has a camming surface that engages an edge of the cover for camming the device during insertion of the element in the bores to the insertion position at which time the web is fractured. The element has a flange plate attached to the element body by a weak web for selective removal of the plate. A resilient tang is attached to the element for engaging a mating locking recess in the body for locking the element to the device and to the bin and cover in the insertion position. Removal of the plate by fracturing the web permits the element to be released releasing the device. Different embodiments are disclosed employing hook shaped tangs which are released by a weak web, J-shaped detents and other arrangements including seals with somewhat differing insertion modes into the tote bin openings.

24 Claims, 12 Drawing Sheets

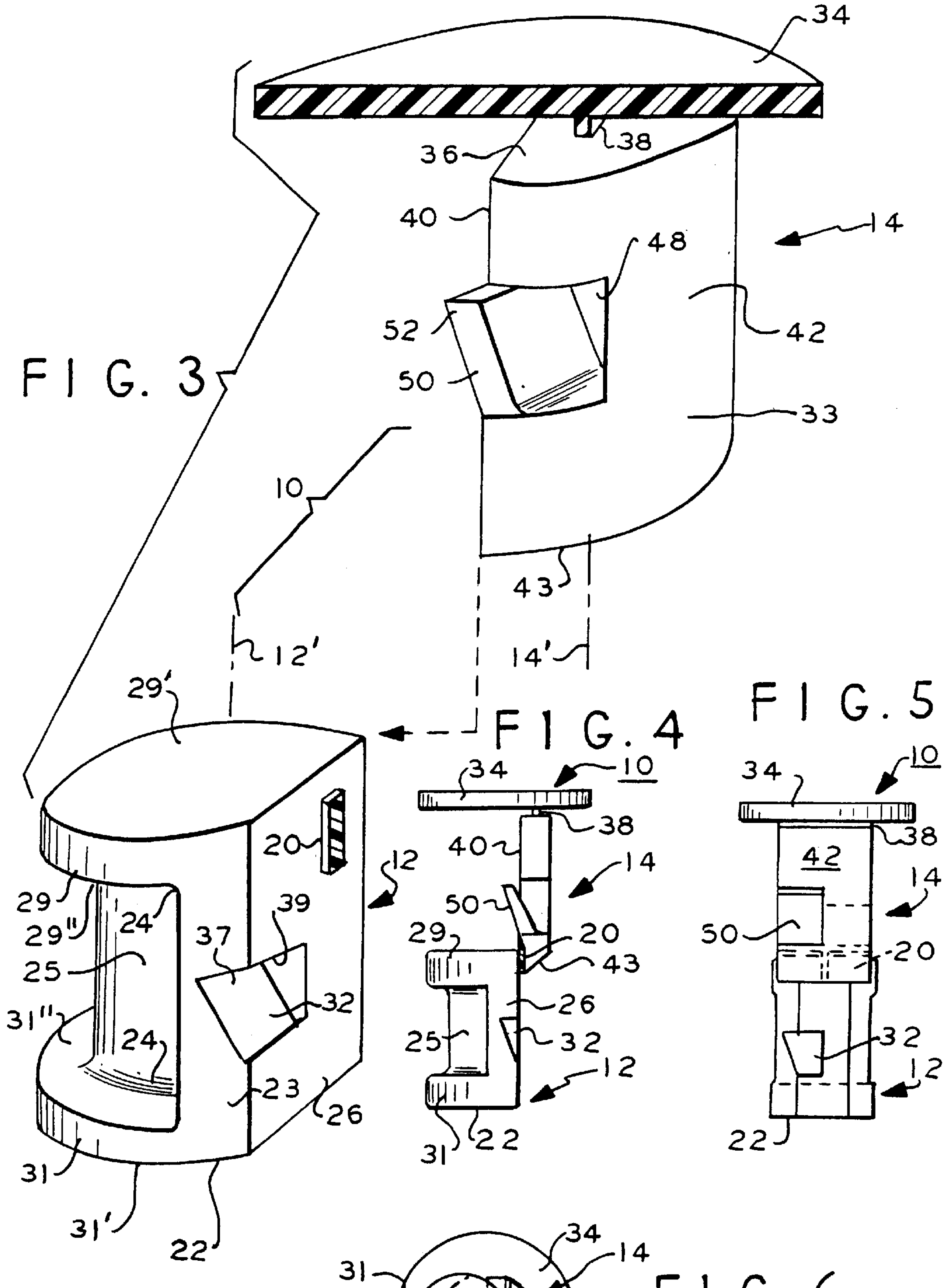
FIG. 3
FIG. 4
FIG. 5
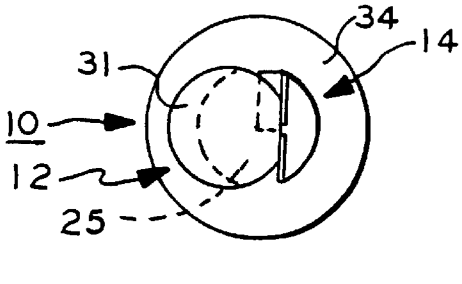
FIG. 6

FIG. 16
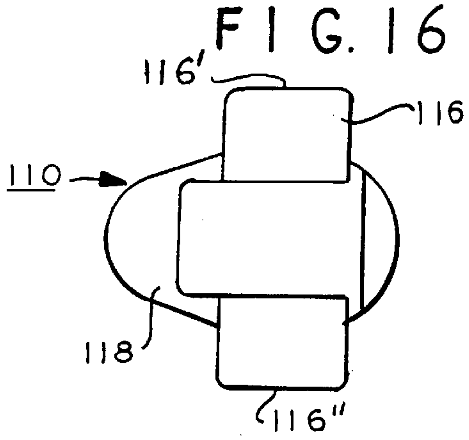
FIG. 20
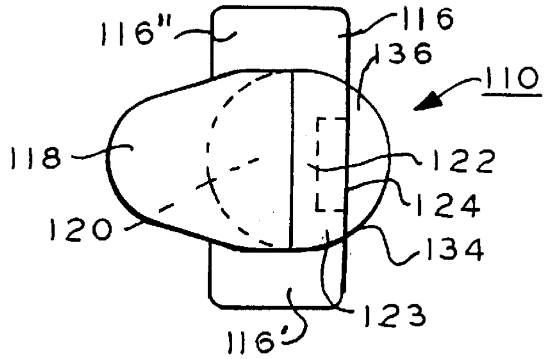
FIG. 17
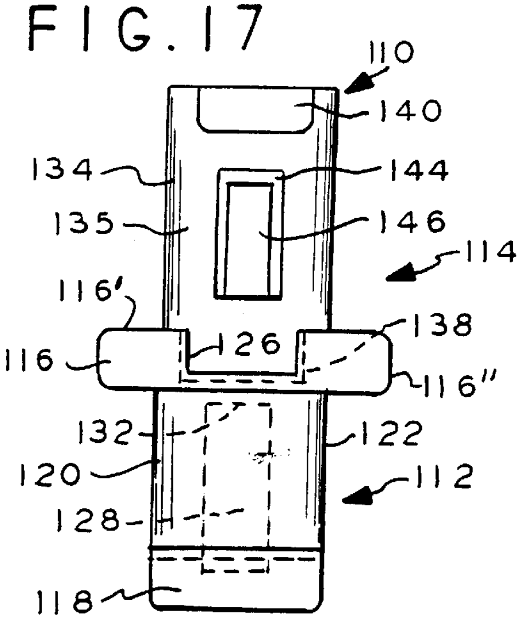
FIG. 19
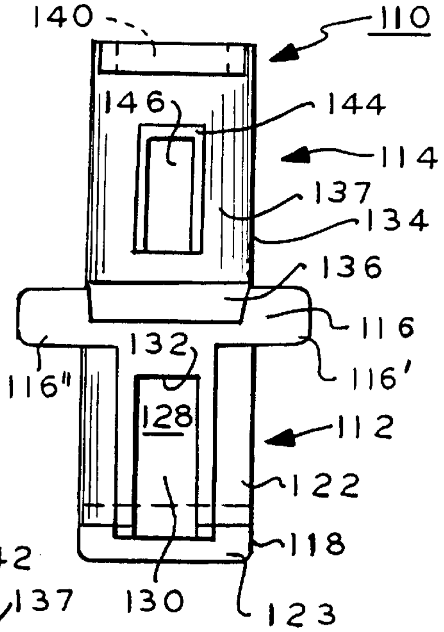
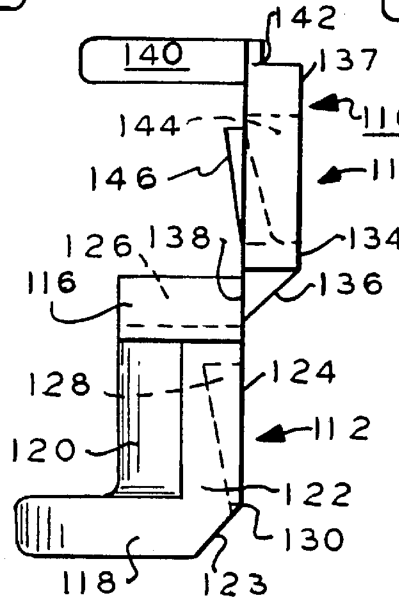
FIG. 18

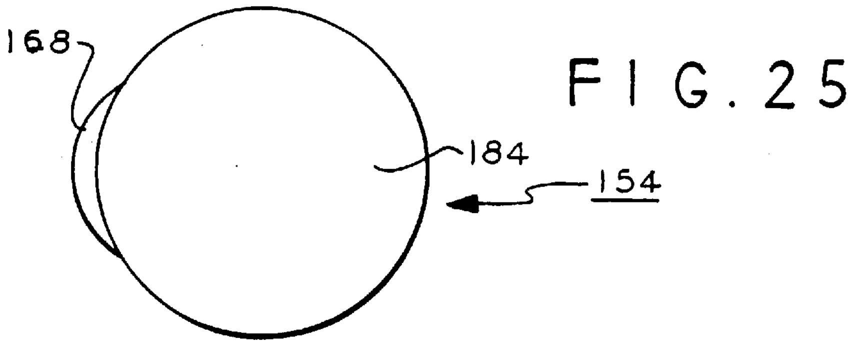
FIG. 25
FIG. 26
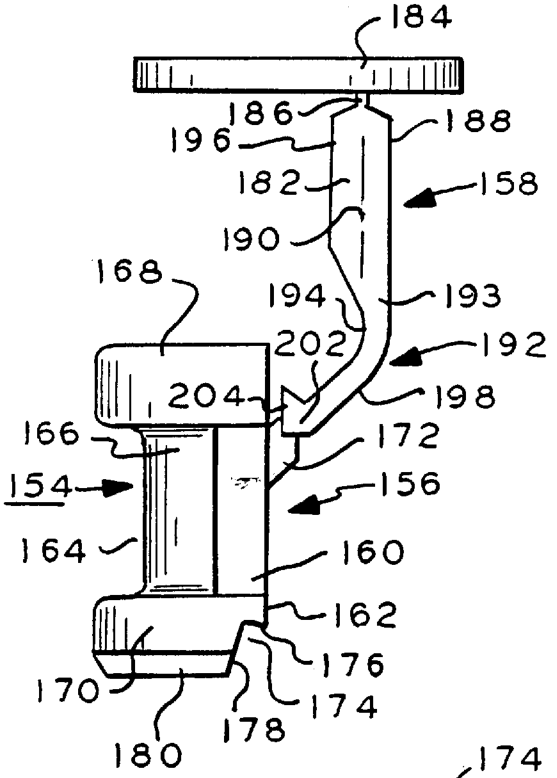
FIG. 27
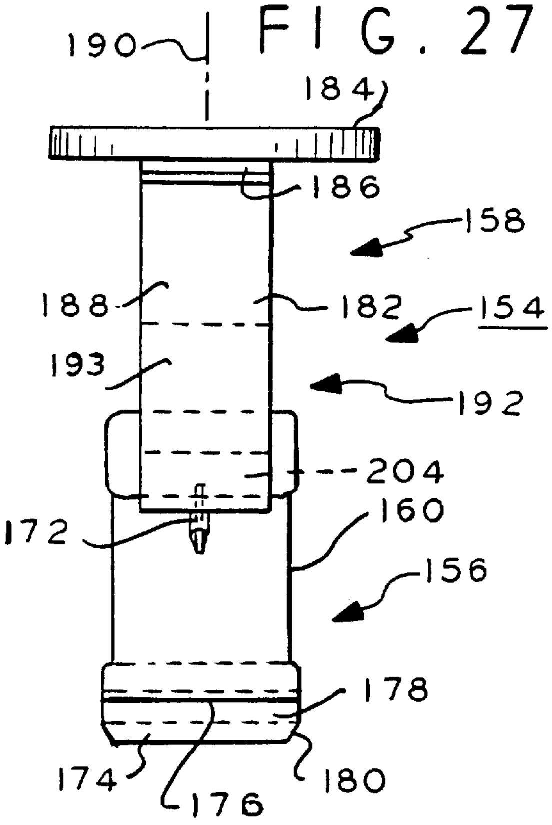
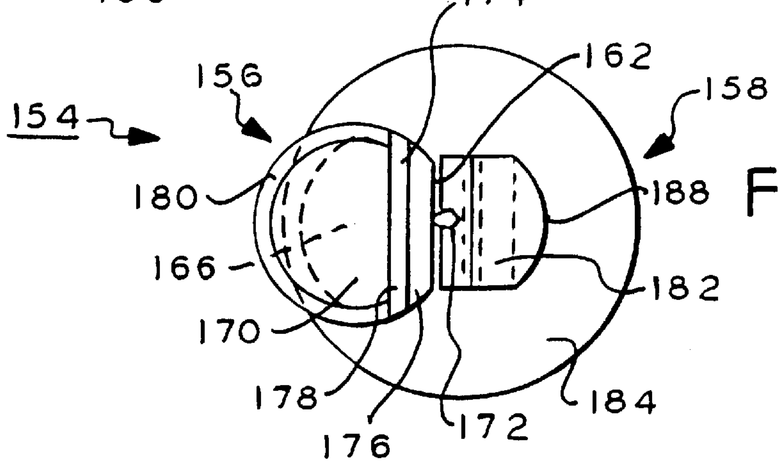
FIG. 28

BIN SEAL AND FASTENER

CROSS REFERENCE TO RELATED APPLICATIONS

Of interest is commonly owned copending application Ser. No. 09/413,689 entitled Locking Seal with Distortable Body filed Oct. 7, 1999 in the name of John K. Roessner III et al.

This invention relates to bin seals, and more particularly to tote bin seals wherein a tote bin has a cover mating with an article receiving bin, the cover and bin have mating openings in which a seal is inserted for temporarily securing the cover to the bin and to provide tampering evidence.

Tote bin seals are in wide use. Such seals, which may be referred to as plug seals, have a shank with a head at one end and reverse directed barbs at the other end which barbs are relative flexible and somewhat weak. The barb end may be pointed as in arrow heads. The barbs are inserted through the cover and bin smaller diameter openings compressing the resilient barbs transversely during insertion. After the barbs pass through the openings they expand and return to their normal position. The barbs and head lock the cover and bin portions therebetween. It is desired that such seals be easily removed to permit the cover to be opened but sufficiently difficult to remove to provide evidence of tampering. An example of such a seals is disclosed in U.S. Pat. No. 2,159,363 ('363). Other seals or fastening devices are disclosed in U.S. Pat. Nos. 5,337,503, 3,954,295, 5,120,097, 5,775,860 and 5,24,945 ('945).

There is a need in the food processing industry for a strong tote bin seal or fastener that can keep the cover closed in the presence of severe shock such as dropping of the bin or roughly handling. It is recognized that such a tote bin seal must keep the cover secure when the bin is dropped 7 feet when loaded with 60 lbs. of food, water and/or ice The seal must be easy to install. The seal must not interfere with a persons hands when lifting the bin. In food processing industry tote bins, the seal openings are located at the peripheral region or flanges of the tote bin which are normally used as lifting grips. Thus the seals are located at the lifting grips and must not injure a person's hands during lifting. The barb type seals (e.g., '363) discussed above have points and are not satisfactory for this purpose. Prior art plug seals are too weak for this application.

A prior art strap type seal may also be used for this purpose (see for e.g., '945). But these seals are also not satisfactory. These seals diminish the gripping area, which is already reduced in area since less amount of material in the gripping area is desired because of the stress caused by the heavy bins. Many prior art seals are not satisfactory because the seals have a dependent relationship between strength for keeping the cover closed and the amount of force needed to remove the seals. If a seal is strong then it is difficult to remove. It is desired that the seal be removable without cutting tools but be sufficiently strong to withstand the above requirements. The food processing industry has a long felt need for a solution to this problem.

A seal and fastener for securing together a plurality of members with aligned bores according to the present invention which overcomes the above problems comprises a locking device with opposing spaced legs, the device for insertion in a first direction into the aligned bores for securing the members together in a locking position in which position the device legs are juxtaposed with a portion of the members and a locking element for insertion into the aligned bores of the members adjacent to the device for locking the device in the locking position.

In one aspect, the device is arranged and constructed so that the device is first inserted to an insertion position in the first direction and is then displaced from the insertion position to the locking position in a direction normal to the first direction in response to the insertion of the element.

In a further aspect, the element and device are interconnected by a frangible web which fractures in response to the insertion of the device and element by an insertion force on the element.

In a further aspect, the device and element include cooperating means for locking the inserted element to the members and to the device in the first direction with the device locked.

Preferably, release means is secured to the locking element for selectively releasing the locked locking element.

In a further aspect, the cooperating means for locking the element includes a locking recess in one of the locking device and element and a locking tang on the other of the device and element for locking engagement of the tang with the locking recess and a flange on the element for cooperating with the tang for locking the element to the device and members.

The device is preferably rigid. In a further aspect, the tang is resilient. Preferably, the device is C-shaped and includes a first body extending along an axis, the spaced legs extending transversely the body and axis, the first body for axial insertion into the aligned bores to the insertion position along the axis in the first direction, the legs for overlying and securing the members together in the device locking position.

In a further aspect, the device is arranged for being displaced normal to the axis and relative to the insertion position to the locking position in response to insertion of the element.

In a still further aspect, the locking element comprises a second body, the first body having a tang locking recess, the second body including a tang extending therefrom for engaging the locking recess, the second body and tang being arranged to axially lock the element to the first body when the tang is engaged with the recess, the element being arranged for axial insertion into said aligned bores to a second insertion position adjacent to the device, the tang for engagement with the tang locking recess in the second position, the tang and second body for axially securing the locking element in said second insertion position and the device in the locking position.

Preferably the second body includes a flange projection releasably secured to the second body for cooperatively securing the members to the second body.

IN THE DRAWING

FIG. 1*a* is a plan view of a covered tote bin with respect to which the seal of the present invention may be used;

FIG. 1*b* is an end elevation view of the tote bin of FIG. 1*a;*

FIG. 3 is an isometric exploded view of a locking element portion and a locking device portion of the seal according to an embodiment of the present invention;

FIGS. 4, 5 AND 6 are respective side, front and bottom plan views of the seal of FIG. 3.

Figure 1A:
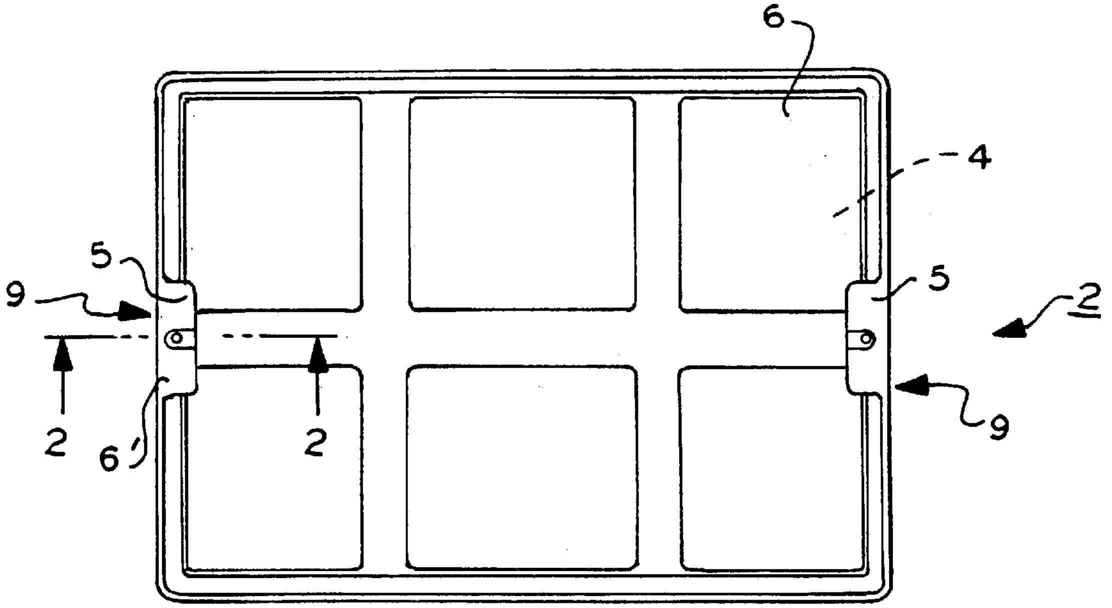
Figure 1B:
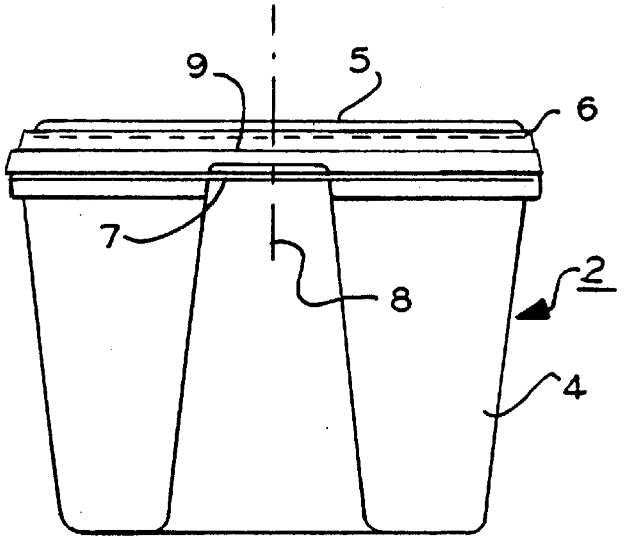
Figure 12A:
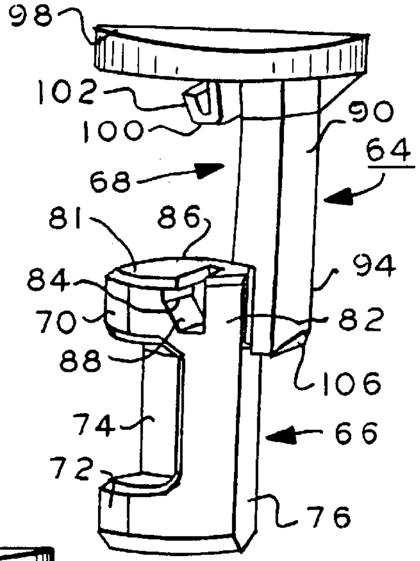
Figure 12:
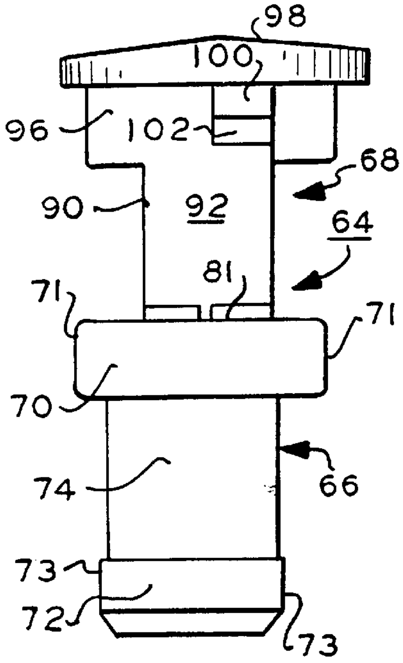
Figure 13:
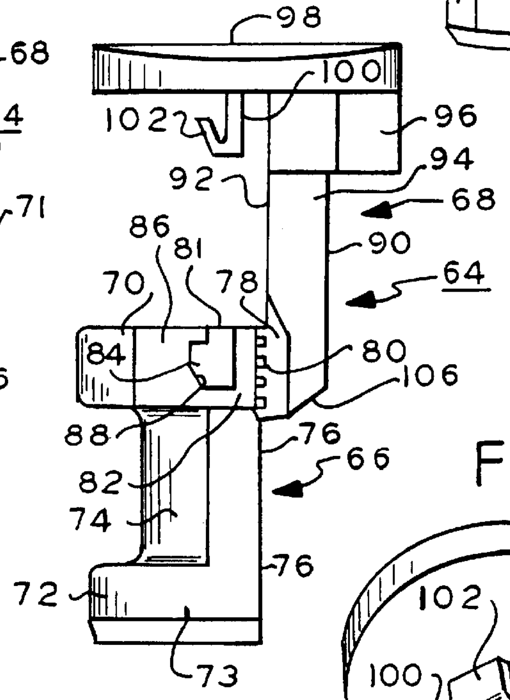
Figure 12B:
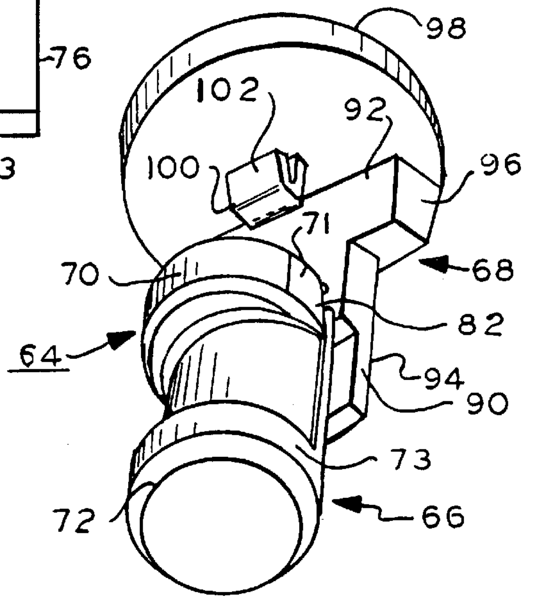
Figure 14:
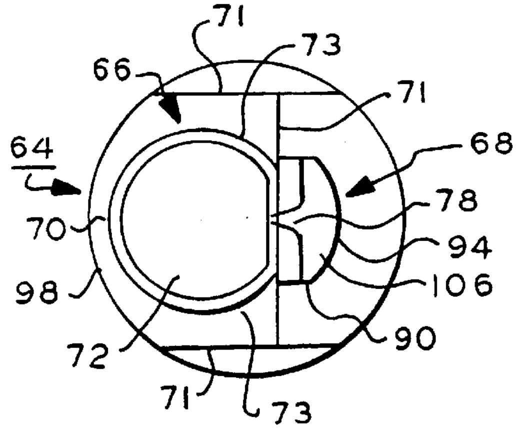
Figure 15A:
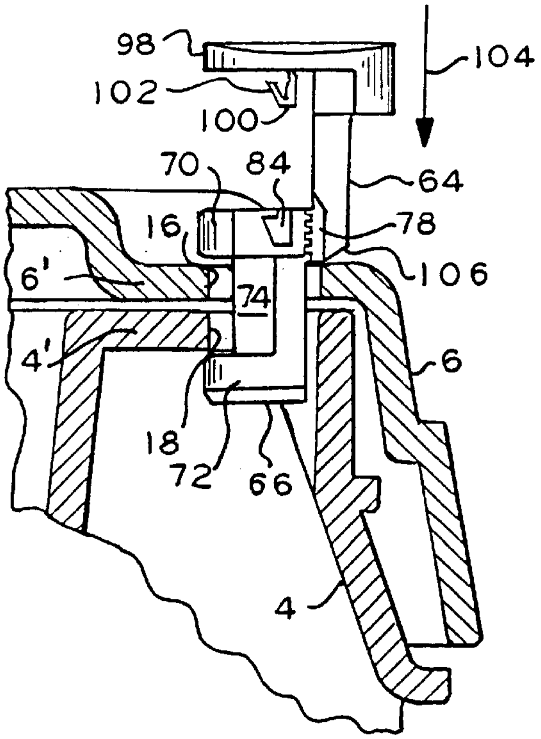
Figure 15B:
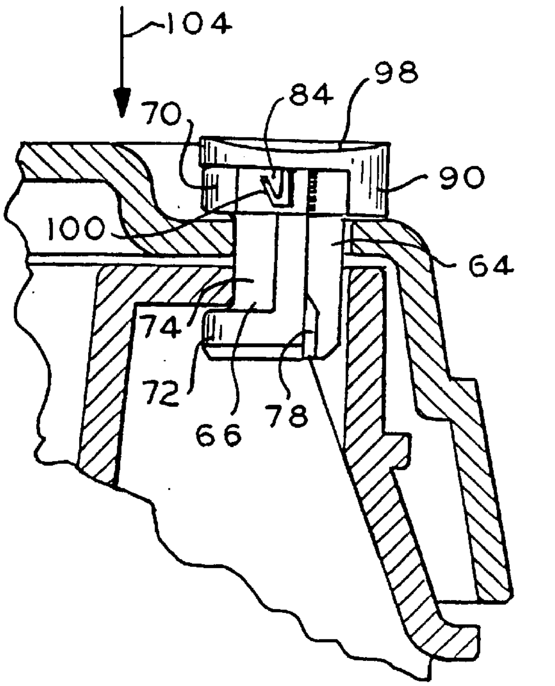

FIGS. 12*a* and 12*b* are isometric views to he seal of FIGS. 11–14;

FIGS. 15*a*–15*b* illustrate various sequential steps for inserting and locking the seal of FIGS. 11–14 to the tote bin of FIGS. 1*a* and 1*b;*

Figure 15C:
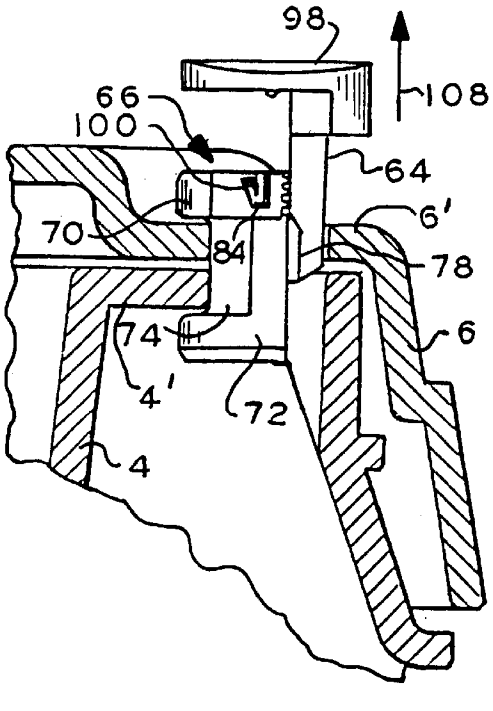
Figure 15D:
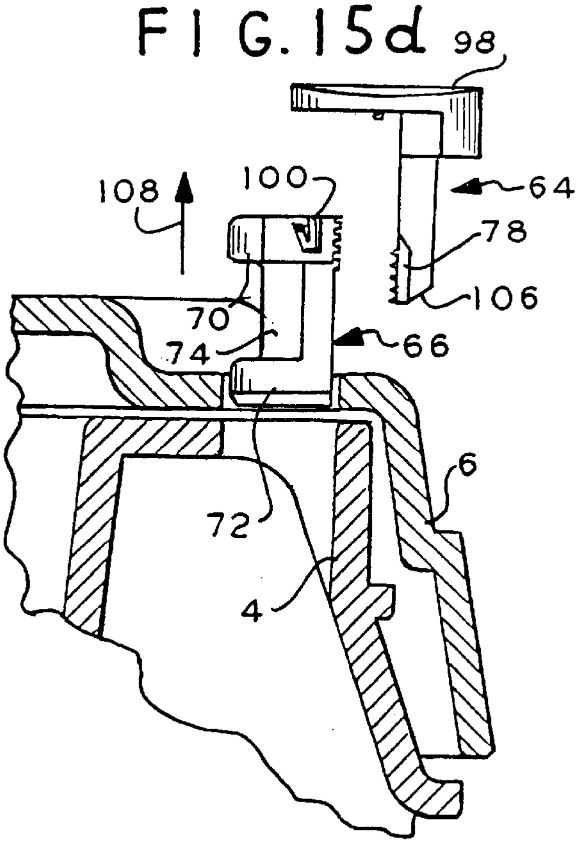

FIGS. 15*c*–15*d* illustrate various sequential steps for releasing and unlocking the seal of FIG. 15*b;*

FIGS. 16–20 are respective top plan, front elevation, side elevation, rear elevation and bottom plan views of a seal according to a third embodiment of the present invention;

FIGS. 21–24 illustrate various sequential steps for inserting and locking the seal of FIGS. 16–20 to the tote bin of FIGS. 1*a* and 1*b;*

FIGS. 25–28 are respective top plan, side elevation, rear elevation and bottom plan views of a seal according to a fourth embodiment of the present invention;

FIGS. 29–32 illustrate various sequential steps for inserting and locking the seal of FIGS. 25–28 to the tote bin of FIGS. 1*a* and 1*b;*

FIGS. 33–36 illustrate various sequential steps for releasing the locked seal of FIGS. 29–32 from the tote bin of FIGS. 1*a* and 1*b*; and FIGS. 37–40 are respective top plan, side elevation, rear elevation and bottom plan views of a seal according to a fifth embodiment of the present invention.

Figure 2:
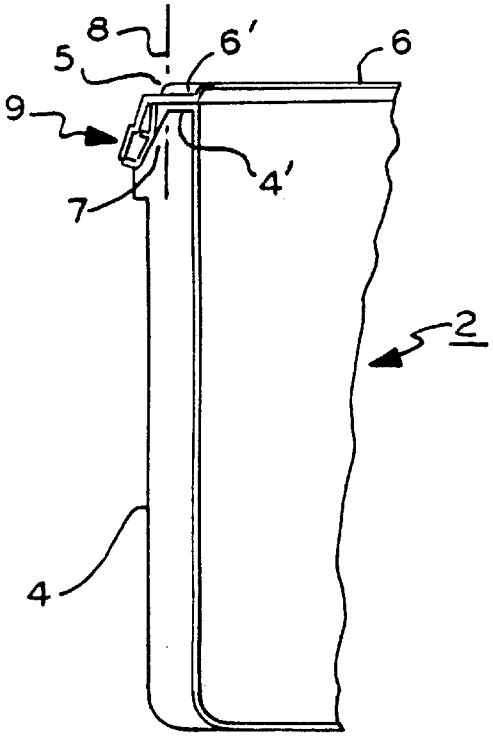
FIG. 2 is a sectional fragmented elevation view of the tote bin of FIG. 1*a* taken along lines 2—2.
Figure 9:
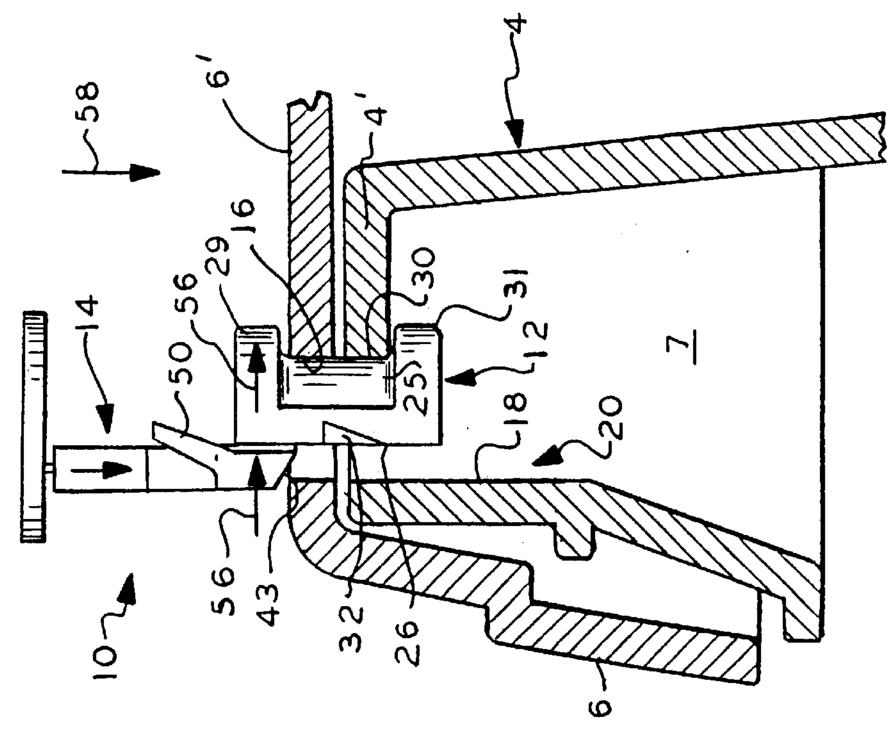
FIGS. 7–10 illustrate various sequential steps for inserting and locking the seal of FIGS. 2 and 3 to the tote bin of FIGS. 1*a* and 1*b;*

In FIGS. 1*a*, 1*b* and 2, a covered tote bin 2 includes a thermoplastic molded sheet material bin 4 and a thermoplastic molded sheet material cover 6 having respective members 4' and 6'. Formed in the cover 6 member 6' are a pair of mirror image handle recesses 5 on opposite sides of the cover. Formed in the bin 4 member 4' are a pair of mirror image handle recesses 7 which are aligned with recesses 5 which recesses 5 and 7 cooperate to form a bin gripping handle 9, the fingers of a user being inserted into the recesses 7 for lifting the bin and cover assembly. As noted in the introductory portion, any pointed seal located in the recesses 7 tend to be injurious to a user. The seals 10 do not have such pointed ends in the recesses 7 and also serve not only as an indicator of tampering, but also serve as fasteners to keep the cover 6 attached to the bin 4 in the presence of drop loads as discussed in the introductory portion.

Figure 7:
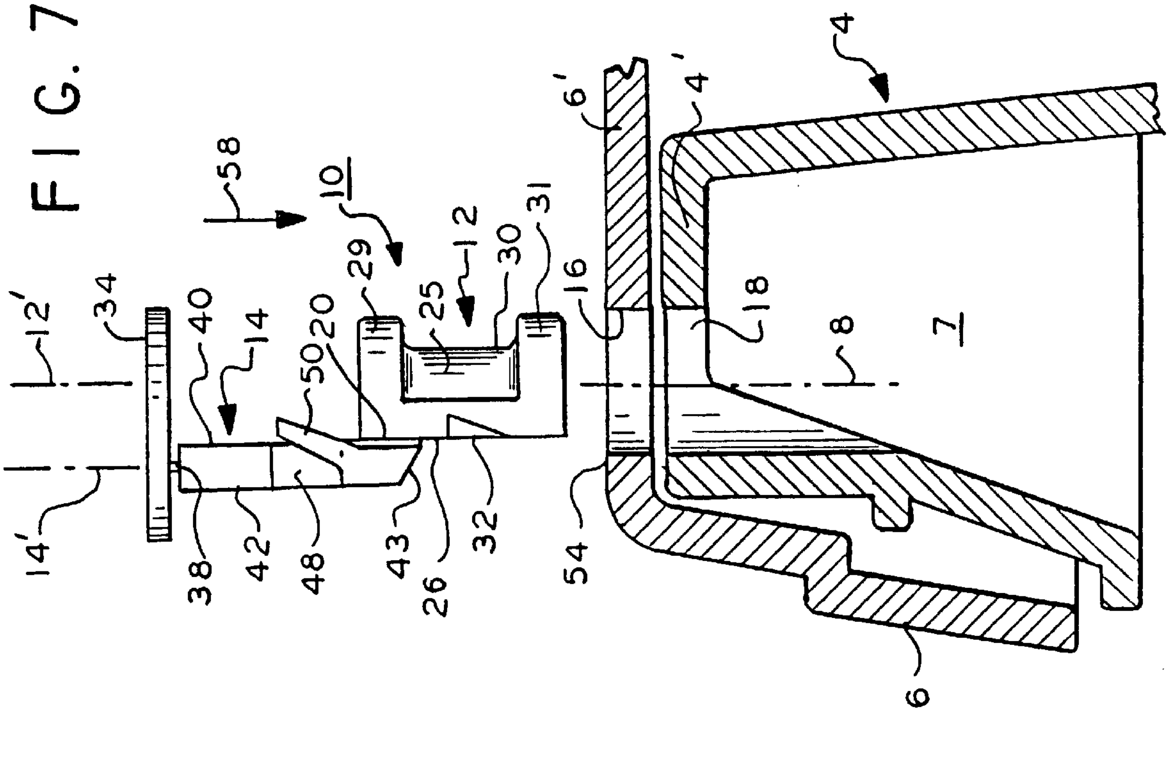
Figure 10:
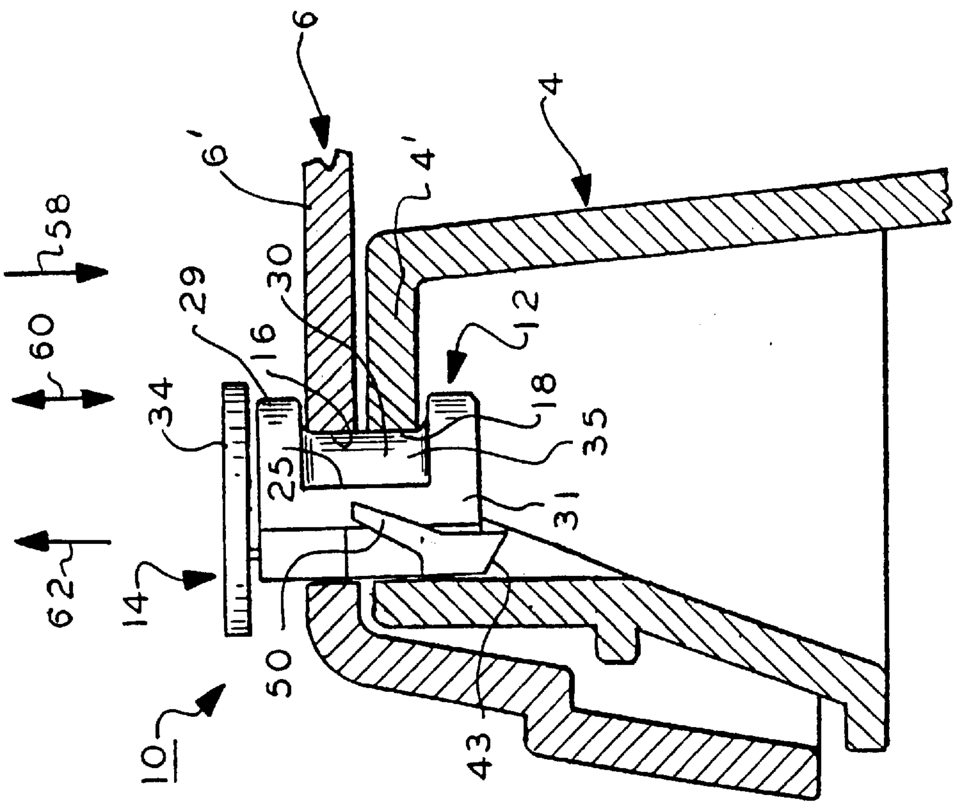

In FIG. 7, a set of circular bores 16 and 18 are aligned on each axis 8 at each handle 9. Bores 16 and 18 are located in the members 6' and 4', respectively, aligned in the center of the handle 9 recesses 5 and 7. Bore 16 is located in the cover 6 member 6' and bore 18 is located in the bin 4 member 4' at each opposite side of the cover-bin assembly. The aligned bores 16 and 18 receive seal 10, FIGS. 3–6, of the present invention. A seal 10 is located at each handle 9 of the bin-cover assembly. In practice the bores in the cover may enlarge relative to the bore in the bin during use. Seal 10 accommodates such differing dimensions.

In FIGS. 2–6, representative locking seal 10 includes a locking device 12 and a locking element 14. Device 12 includes a body 22 having a planar rear face 26. The body 22 is generally C-shaped with two legs 29 and 31 defining a recessed central section 25. The legs 29 and 31 and central section 25 form circular cylindrical segments terminating at the planar rear face 26 with a common circular cylindrical segment at rear portion region adjacent to the rear surface. The front portion of section 25 cylindrical segment has a central axis that is offset from the central axis of the legs. The section 25 is joined to the legs by relative large radii 24 which add to the strength of the legs to preclude bending of the legs providing a robust strong structure. The legs extend from the section 25 approximately 25% of the diameter of the legs and thus are cantilevered a relatively short distance form the rear wall. The body 22 may comprise molded thermoplastic or molded thermosetting plastic material, or formed of a metal that may be molded such as die cast or other metals such as steel or aluminum, for example. The section 25 forms a cavity volume which is less than 50% of the volume defined by the projected peripheral boundaries of the legs 29 and 31. The central section 25 forms a robust relatively high strength rigid structure in combination with the legs 29 and 31 and rear wall 23.

The rear face 26 of rear wall 23 is relieved to define a locking recess 32. The recess 32 is rearward of the section 25. The recess 32 has a surface 37 inclined to the planar rearward face 26. The surface 37 inclines toward leg 29 and inwardly toward the section 25. The surface 37 terminates within the interior of the recess 32 at planar surface 39 which is normal to and in communication with the planar rear face 26. The legs 29 and 31 are planar and preferably parallel on their outer surfaces 29' and 31' and inner surfaces 29" and 31". A frangible web 20 (shown sheared in FIG. 3) attaches the device 12 to the locking element 14.

Locking element 14 of the seal 10 is preferably made of molded thermoplastic material and includes a semi-circular cylindrical solid body 33 and an upper circular cylindrical relatively thin top plate 34 forming a flange for gripping and insertion of the element 14 and device 12 joined to the element 14 by web 20 into the bin bores 16 and 18 as described below. The body 33 has a forward planar face 40, a circular cylindrical rearward face 42, a planar inclined bottom face 43 and a planar upper face 36. The plate 34 is secured to the upper face 36 of the body 33 by a frangible thin web 38. The web 38 has a relatively short height between the body 33 face 36 and plate 34 forming a relatively weak connection to the body 33. Twisting of the plate 34 relative to the body 33 fractures the web 38 permitting the plate to be severed from the body 33. Other weakening arrangements may be provided in the alternative to permit selective manual separation of the plate 34 from the body 33. For example, the plate 34 may be connected directly to either of faces 36, 40 or 42 by a thinned section forming a groove (not shown).

The rear face 42 is relieved to define a recess 48 in which is formed a detent in the form of a locking tang 50. The recess 48 extends partially into the forward face 40. The web 20 is attached to and centrally of the forward face 40. Tang 50 is somewhat tapered and truncated at upper end 52. The tang 50 is resilient and may be separately formed and secured within the recess 48, or may be formed one piece integral with the device 14 such as by molding Tang 50 extends inclined outwardly from the recess 48 such that its upper end 52 is disposed outwardly of the forward face 40. The tang 50 is sufficiently resilient to resiliently displace from its no load position as shown in FIG. 3 to a position where all of the tang 50 is retracted within the recess 48. The bottom face 43 of the locking element 14, FIG. 4, is inclined relative to planar face 40 forming a camming surface. The face 43 inclines preferably about 45°.

In operation, reference is made to FIGS. 7–10. In FIG. 7, the cover 6 member 6' is positioned over the bin 4 member 4' such that bin bore 18 and cover bore 16 of one bore set are axially aligned to define a common through bore on the corresponding axis 8. The locking device 12 and locking element 14 are illustrated positioned above a bore set 20 aligned on axis 8 prior to insertion into the bores. The element 14 is held to the locking device 12 by the web 20 with the longitudinal axe 12' of the device 12 and axis 14' element 14 parallel.

Figure 8:
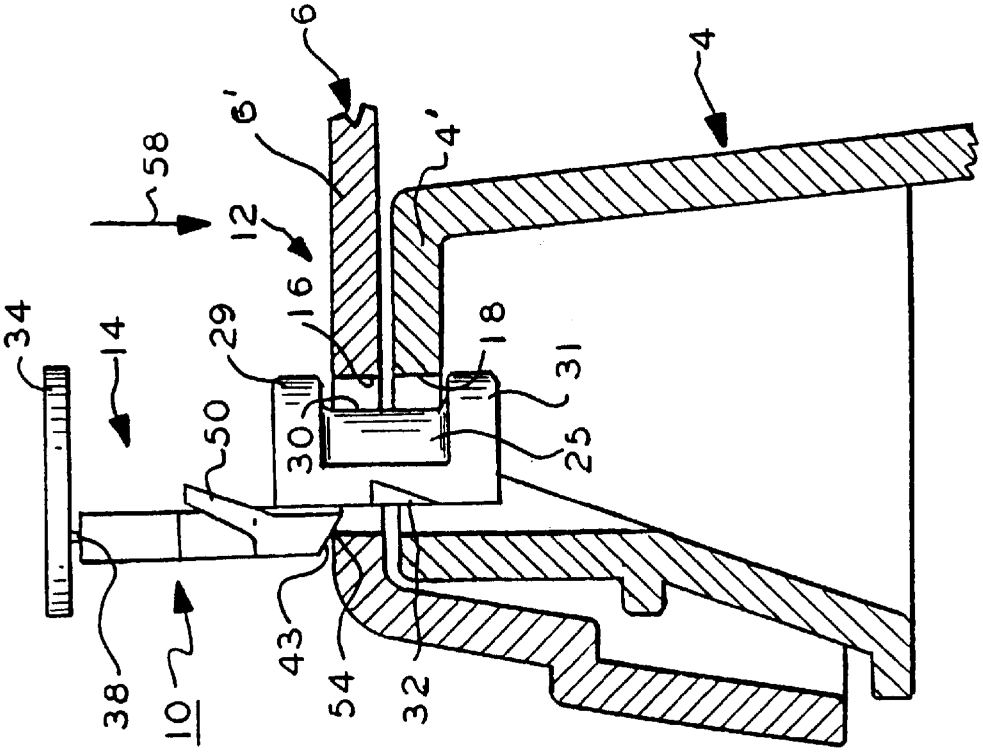
Figure 11:
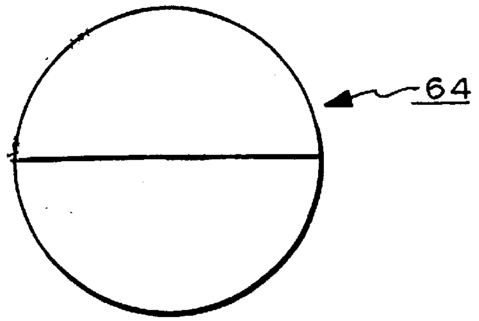
FIGS. 11–14 are respective top plan, front elevation, side elevation and bottom plan views of a seal according to a second embodiment of the present invention.

In FIG. 8, the next step for insertion of the locking element and locking device for sealing and locking the cover to the bin is shown. The device 12 is inserted in direction 58 into the bores 16 and 18 to an insertion position as shown. In this position, the legs 29 and 31 are respectively spaced above and below the respective cover member 6' top surface and bin 4 member 4' bottom surface. The legs are spaced apart to receive the adjacent overlying cover and bin 4 members 6' and 4' portions in the relieved cavity formed by section 25. The cover and bin bores are circular to receive the device 12 and element 14. At this insertion position of the device 12, the inclined surface 43 of the locking element 14 is engaged with the upper comer edge 54 of the bore 16 of the cover 6. The bottom face 43 of the element 14 forms a camming surface for camming against edge 54. Tang 50 is disposed above and vertically aligned with the recess 32 of the of the inserted locking device 12 with the web 20 attached to the device and element.

As the element 14 is displaced downwardly toward the cover and bin members in direction 58, the element 14 bottom face 43 cams against the edge 54 to translate the element 14 and device 12 in the direction of the arrows 56 to the right in FIG. 8. This places the legs 29 and 31 juxtaposed partially over the cover 6 and bin 4 members overlying the members in a locking position. Because the legs 29 and 31 can no longer move downward, the continued downward displacement of the element 14 in the insertion direction shears the web 20 separating the element 14 from the device 12.

The displacement in direction 58 continues until the surface 30 of section 25 engages the side surfaces of the bores 16 and 18. Further downward displacement of the element 14 relative to the device 12 causes the tang 50, which is resiliently compressed from its quiescent position of FIG. 3 by face 26 (FIG. 3) of the device 12, to engage the recess 32 in the device 12, FIG. 10. The tang 50 tends to return to its original extended position in FIG. 10 when aligned with the recess 32 locking the element axially in place. The element 14 is now also in an insertion position and is in the locking position. The element 14 outer circular segment surface combines with the circular surface of the device 12 section 25 surface to substantially fill the bores 16 and 18 as a circular cylinder. This precludes the device 12 from being translated to the left in FIG. 10 to release the device and the cover from the bin.

With the parts so relatively positioned, the device 12 and element 14 are precluded from vertical displacement in the vertical directions 60 by the reception of the edges of the bin and cover members at the bores 16 and 18 within the recess formed by section 25. The legs 29 and 31 lock the bin and cover members 4' and 6' together. The element 14 is precluded from upward displacement in direction 62 by the cooperation of the tang 50 within the recess 32 and from downward movement in direction 58 by upper plate 34 which overlies the device 12 and the cover 6 member 6' at the bore 16.

When it is desired to unlock the seal 10, the upper plate 34 is popped off and severed from the body 33 manually by twisting the plate or by using a screw driver between the upper plate 34 and body 33 face 36 (FIG. 3), fracturing the post 38. The locking element 14 can then be displaced downwardly in direction 58 to release the resilient detent 50 from the recess 32. The element 14 will then be released and can be further displaced free of the cover and bin members. The undesired popping off of the plate by an unauthorized person provides visible evidence of tampering.

In FIGS. 11–14 and **12*a*–12*b*, thermoplastic molded one piece seal 64 comprises a locking device 66 and a locking element 68. The device 66 has two legs 70 and 72 and a recessed central section 74. The legs and central section have semi-circular segment portions with the central segment section intersected by the planar rear wall surface 76. The upper leg 70 is formed with a front portion as a segment of a larger diameter cylinder than the lower leg. The sides 71 and 73 of the respective legs 70 and 72 are flat and parallel. The upper leg is thus larger than the lower leg 72. A thin frangible web 78 extends from the rear wall surface 76 and attaches the device 66 to the element 68. The web 78 as shown is formed with an array of small webs somewhat like a perforated strip with a series of apertures 80 at the device 66 for attaching the device to the element 64**.

The device body 82 portion coplanar with upper leg 70 has a channel 84 in upper surface 81. The channel 84 has an overlying lip 86 at surface 81 and an inclined surface 88 interior the channel. The channel 84 extends partially across the body 82 surface 81 for approximately 80% of the leg 70 width. This length is not important.

The element 68 has a semi-circular segment elongated body 90 with a planar front face 92 and semi-circular rear face 94. The body 90 has an enlarged upper boss 96 that is -shaped as seen in FIG. 12. The body 90 has a width (top to bottom of the figure) that is the somewhat smaller than that of the leg 72, FIG. 14. A circular cylindrical plate flange 98 is attached one piece and integral with the body 90 boss and extends cantilevered therefrom overlying the device 66. The flange has a larger diameter than that of the upper leg 70 and the element body 90 combined as seen in the bottom plan view of FIG. 14. A resilient tang 100 with an upwardly extending hook portion 102 depends from the under side of the flange 98. The tang 100 is dimensioned to mate with and engage the channel 84 as shown in FIG. **15*b*. In this engaged state the hook portion 102 locks with the lip 86 to prevent disengagement of the tang 100 from the channel opposite the insertion direction, arrow 104. The bottom edge surface 106 of element 68 is chamfered with an incline to form a camming surface similar to the surface 43 of the device of seal 10, FIG. 3**.

In FIGS. **15*a* and 15*b*, sequential steps are shown for locking the seal 64 to the tote bin and cover members 6' and 4', respectively. The seal 64 device 66 is inserted in the direction of arrow 104 into the bores 16 and 18. Continued insertion cams the device 66 to the left in the drawing to the position of FIG. 15*b* and fractures the web 78 at the same time. The web thus keeps the device and element aligned during insertion. The canmming surface 106 displaces the device and element to the left by engagement with the comer edge of the cover member bore 16. Continued insertion of the element causes the locking tang 100 to engage the channel 84 of the device 66. The locking hook portion 102 of the tang locks to the lip 86** of the device channel.

In FIG. **15*c*, the plate 98 is used to lift the element 64 in release direction 108. A screw driver may be used to assist in this operation. The insert is lifted to fracture the tang 100 since the device 66 is locked in the direction 108 by its legs engaged with bin and cover. The element 64 is then lifted free of the bores of the tote bin such that the device 66 may be translated to the right in the figure to free it for vertical displacement, direction 108, from the bores of the bin as shown in FIG. 15*d***.

In FIGS. 16–20, a one piece molded thermoplastic seal 110 comprises locking device 112 and locking element 114. The device 112 has legs 116 and 118 and semi-circular cylindrical segment central section 120 in body 122. Leg 118 extends normal from the planar rear face 124 of the body 122. Leg 118 is somewhat pear shaped in plan view, FIG. 20. Leg 116 comprises two mirror image sections 116' and 116" and extends in a direction transversely to the length of leg 118 forming a T-shape with leg 118 in plan view, FIGS. 16 and 20. Leg 116 is generally rectangular. As a result, only leg 118 extends from the section 120 normal to the rear face 122, the leg 116 being coextensive with section 120 in this normal direction. The sections 116' and 116" are divided centrally by a rectangular channel 126. Channel 126 extends for the full width of the leg 116 normal to the drawing sheet, FIG. 17. A wedge shaped recess 128 is formed in the rear face 124 having an inclined surface 130 and a normal surface 132 relative to the rear face. The body 122 has a an inclined chamfered bottom edge 123.

The element 114 comprises a body 134 having a flat forward face 135 and a semicircular rear face 137 and an inclined surface 136 at its lower edge. The body 134 and the section 120 together in abutting flat face relation in plan view form a circular cylinder as shown in FIG. 20. This cylinder fits within the bores of the tote bin. The body 134 is attached to the device 112 body 122 by a thin U-shaped frangible web 138, FIG. 17. An upper flange plate 140 is cantilevered form the body 134 by a thin frangible web 142. A recess 144 is formed through the body 134 rear and forward faces. An inclined resilient tang 146 is attached to the body 134 in the recess 144 and extends from the recess 144.

Figure 21:
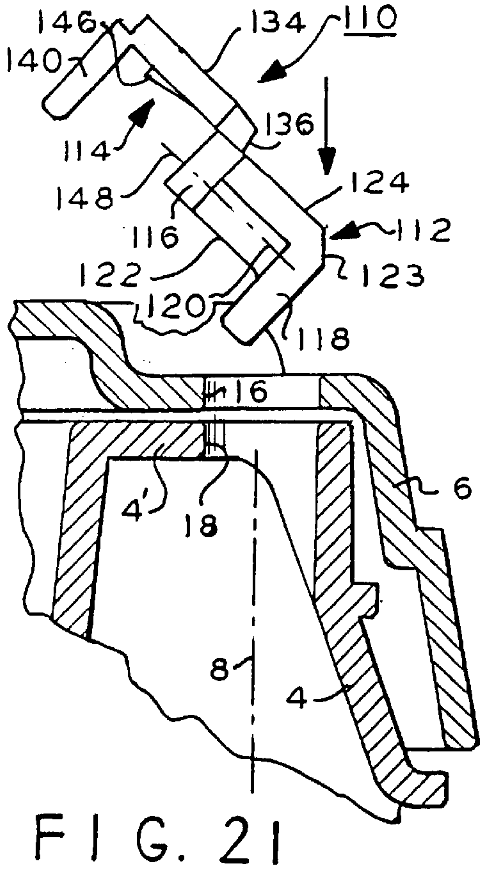
Figure 22:
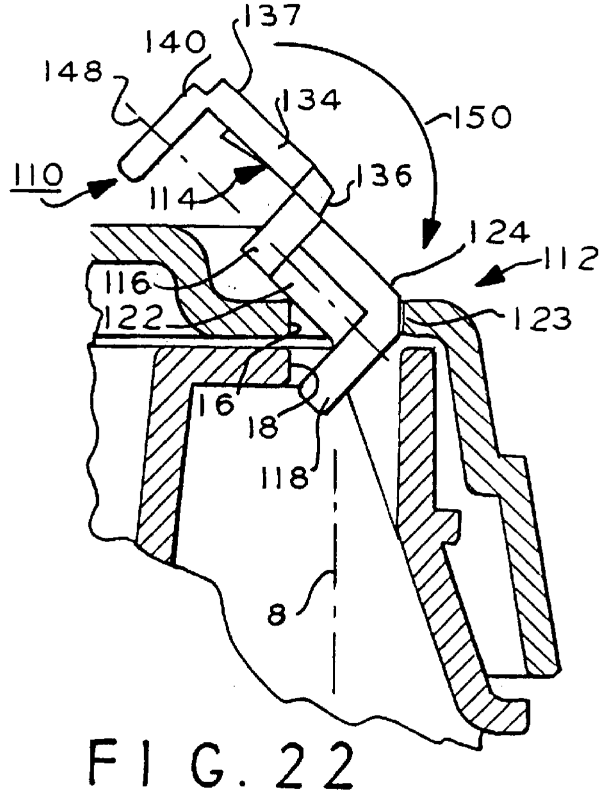
Figure 23:
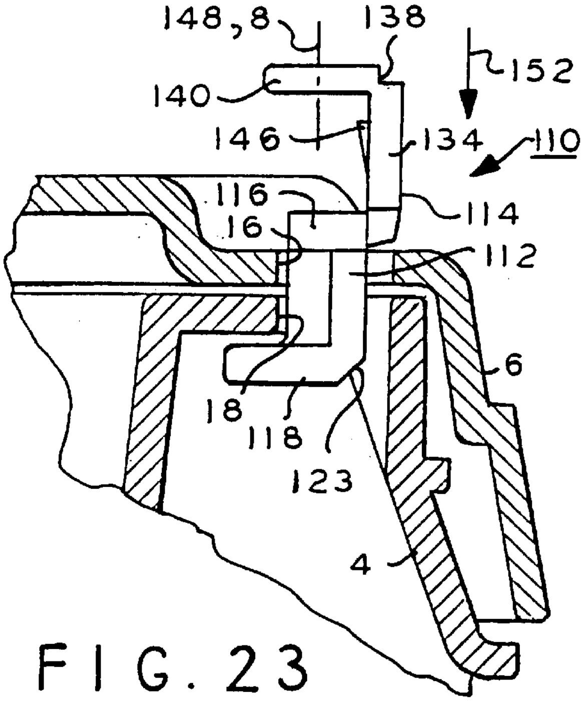
Figure 24:
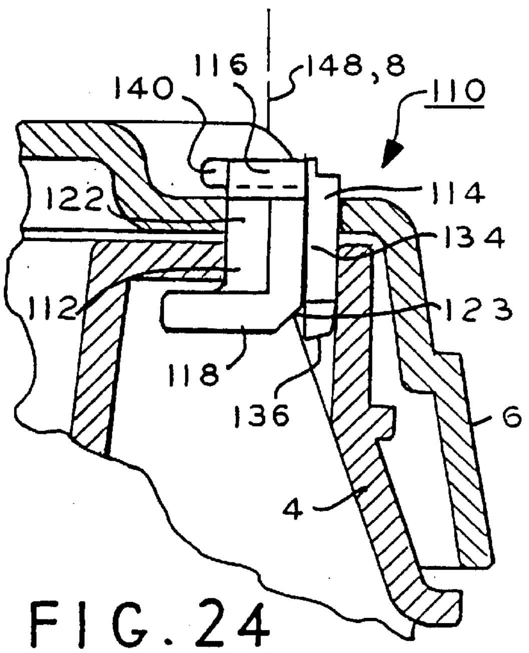

In operation, the seal 110 insertion sequence is shown in FIGS. 21–24, whereby the seal 110 is locked in FIG. 24. In FIGS. 21 and 22, the seal 110 is tilted and rotated in direction 150 as shown so leg 118 can be passed through the bores 16 and 18 to the position of FIG. 23. In FIG. 23 the seal axis 148 is aligned on the bore axis 8. The chamfered edge 123 on the device 112 body 122 permits the tilted body 122 to pass through the cover bore 16 and bin bore 18, FIG. 22. The device 112 upper leg 116 sections 116' and 116" overly the cover member 6', FIG. 24 in the device inserted position, FIG. 23.

In FIG. 23, the device and element are aligned on axis 8. The seal 10 is then displaced to the left in the figure to secure the device 112 to the tote bin members 4' and 6' in overlying locking relation. The locking element 114 is then displaced downwardly in the figure to the position of FIG. 24 in the direction of the arrow 152. This displacement fractures the web 138. separating the element 114 from the device 112. The element when in the final insertion position of FIG. 24 wedges between the device 112 and the edges of the bores 16 and 18. This precludes the unlocking displacement of the device 112 to the right in FIG. 24. Together the device and element have a circular cylindrical cross section as seen in FIG. 20. This cylindrical section fits closely within the bin and cover bores.

As in the prior embodiments, the tang 146 engages the locking recess 128 in the device 112. The engaged tang locks the element to the device preventing displacement upwardly opposite direction 152. The plate 140 prevents the element 114 from being displaced downwardly in direction 152 independently of the device 112, which is locked vertically in direction 152. The plate 140 is nested within the channel 126 (FIG. 17) of the device 112. A portion of the plate 140 overlies the bin cover member to further axially lock the seal 10 along axis 8 (FIG. 24). Thus the device leg 116 sections 116' and 116" and the plate 140 cooperate to secure the seal 110 to the covered bin. The relatively robust bodies of the combined device and element and the legs and plate 140 serve as a fastener to lock the bin cover in place regardless excessive shock loads induced by the dropping of a fully loaded bin. Prior art seals tend to fail under such loads causing the contents to spill out by releasing the cover.

To unlock the seal 110, the flange plate 140 is separated from the body 134 of the element 114. This frees up the element for dislodging from its locked inserted position of FIG. 24. The element is then pushed axially downwardly, direction 152 (FIG. 23). The tang 146, being resilient compresses into the recess 128 of the device until the element is free of the device. The device is then removed in reverse of the cycles shown in FIGS. 22 and 23.

In FIGS. 25–28, a third embodiment of a seal according to the present invention comprises a one piece molded thermoplastic seal 154 including a locking device 156 and a locking element 158. Seal 154 locking device 156 has a substantially circular cylindrical body 160 formed into a cylindrical segment by planar rear wall 162. Body 160 has a recess 164 with a circular cylindrical segment 166. The recess 164 forms legs 168 and 170 in the body 160 having the same shape and dimensions in plan view, FIG. 28. A thin pear shaped web 172 in cross section projects from the rear wall 162. A recess 174 formed in rear wall 162 has a first surface 176 inclined relative to rear wall 162 and a second surface 178 at about right angles to surface 176 and also inclined relative to wall 162. Recess 174 forms a locking notch. The bottom leg 170 has a chamfer 180 at its lower edge.

Locking element 158 has a body 182 and a circular cylindrical top plate 184 connected to the body by a thin frangible web 186. The plate 184 is larger in diameter than the legs 168, 170 and body 160 of the device 156. The body 182 has a circular cylindrical segment rear wall 188. Plate 184 is normal to the length dimension of the body 182 along axis 190 of the element 158. The lower portion of the body 182 comprises a hook 192.

Hook 192 has a depending leg 193 formed by recess 194 in the front wall 196 of the body 182. A leg 198 depends from leg 193 at a bight 200 and is inclined about 45 degrees with respect to axis 190. A tang 202 with a triangular tip 204 is disposed at the end tip of leg 198. The tip 204 mates with the recess 174 in the locked state of FIG. 32.

Figure 29:
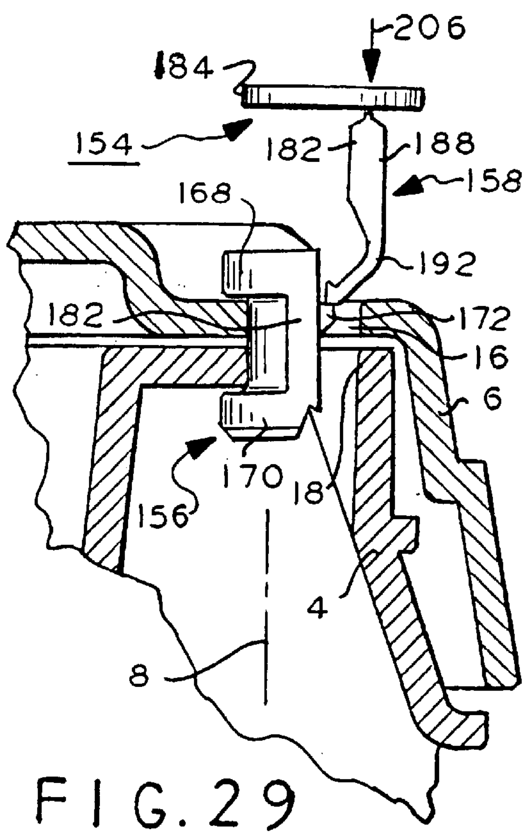

In FIGS. 29–32, the device 154 is inserted into the cover and bin bores 16 and 18 in the sequence shown in the different figures. In FIG. 29, the device 156 is first inserted into the bores, axial direction 206. and its legs engaged with the overlying bin and cover members by translation laterally relative to axis 8. The element 158 is used as a handle for this insertion and in the prior discussed embodiments.

Figure 30:
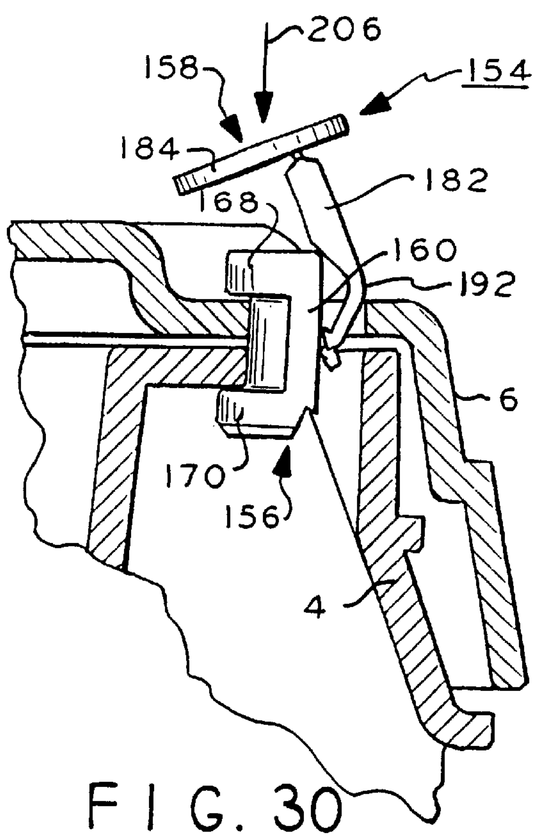
Figure 31:
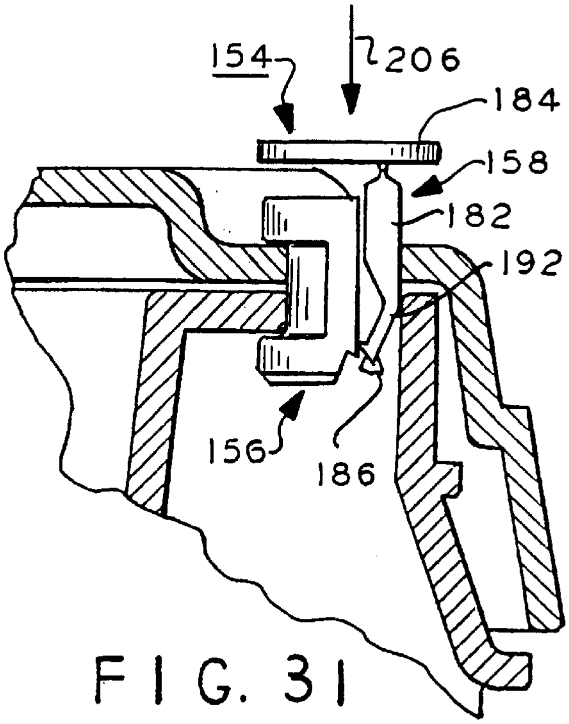
Figure 32:
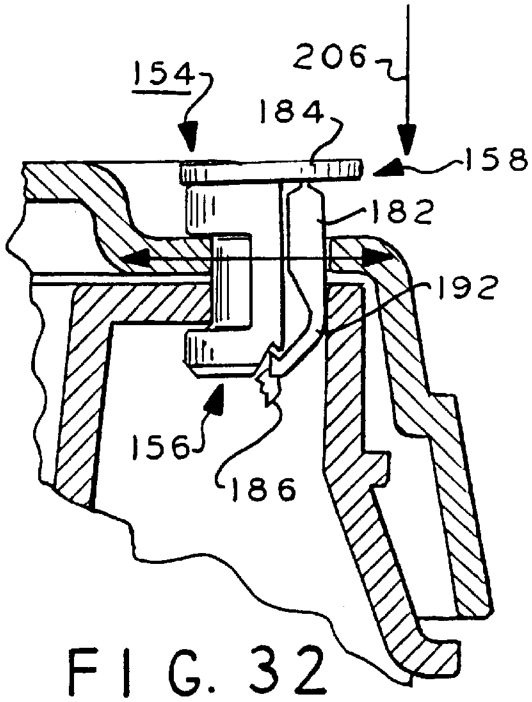

In FIG. 30, with the device 156 locked in position axially, the element is pushed in direction 206 until the web 186 breaks. The element 158 is then tilted as shown as it is further displaced into the bores adjacent to the device 156. The resilient hook 192 resiliently flattens as the element is returned to its axial position on axis 8, FIG. 31, while it is further axially displaced in direction 206. The flattened hook 192 places a resilient bias against the device 156 in the locked position to the left of the figure, FIG. 31. The element 158 is further axially displaced until the tip 204 of the tang 202 engages the recess 174 (FIG. 26) as shown in FIG. 32. Once the tip engages the recess 174, the plate 184 prevents further axial displacement of the element in direction 206 and the hook 192 prevents axial withdrawal displacement of the seal 154 in a direction opposite direction 206. The device 156 and element 158 have complementary cylindrical shapes to fit within and abut the edges of the bores 16 and 18. The element 158, is relatively wider (FIG. 27) than it is thick (FIG. 26) (left to right directions in the figures). The thickness of the element 158 in FIG. 26 is such that its segmented cylindrical shape is complementary with the segmented cylindrical shape of the device 156 so they both fit within the aligned cylindrical bin and cover bores 18 and 16 (FIG. 32). Segment 166 of the device 156 front face abuts the edge of the bin and cover bores.

Figure 33:
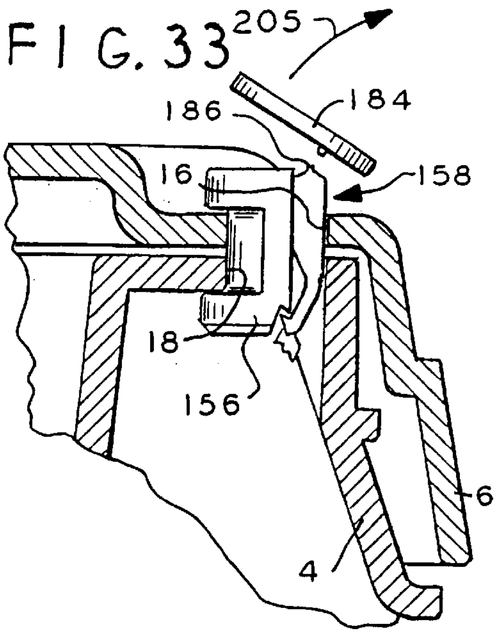
Figure 34:
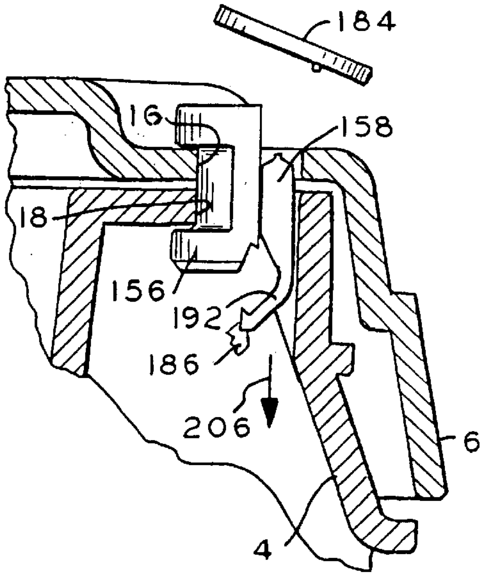
Figure 35:
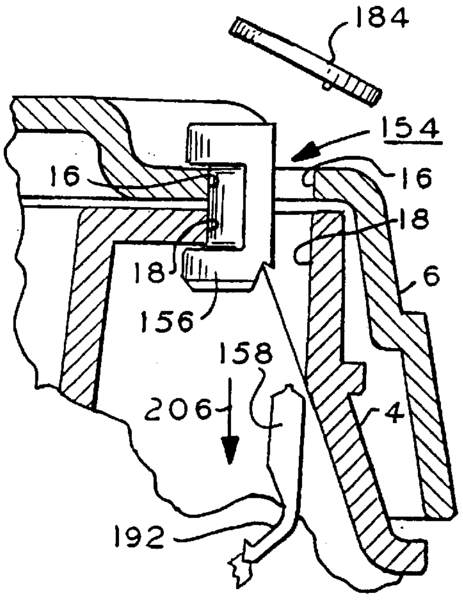
Figure 36:
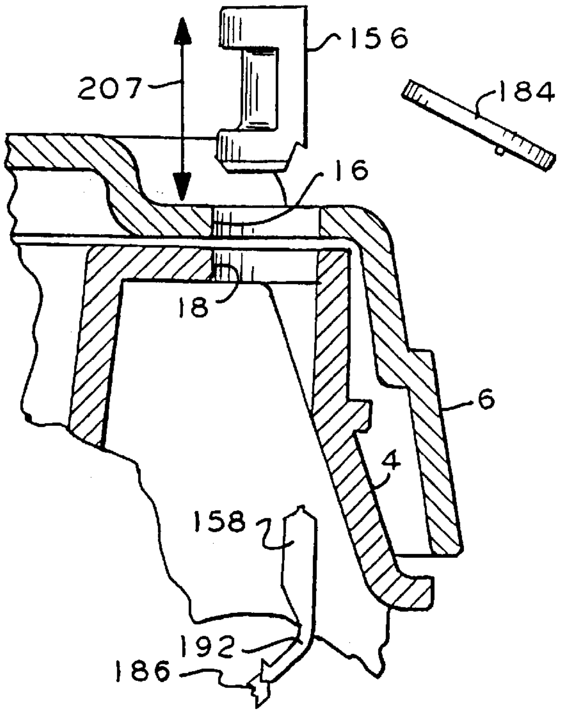
Figure 37:
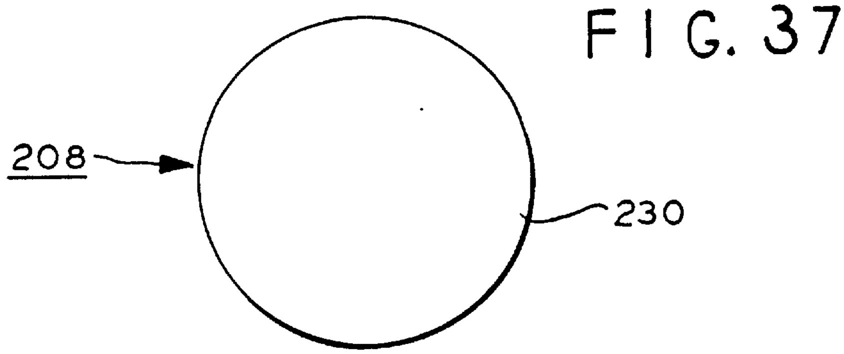
Figure 38:
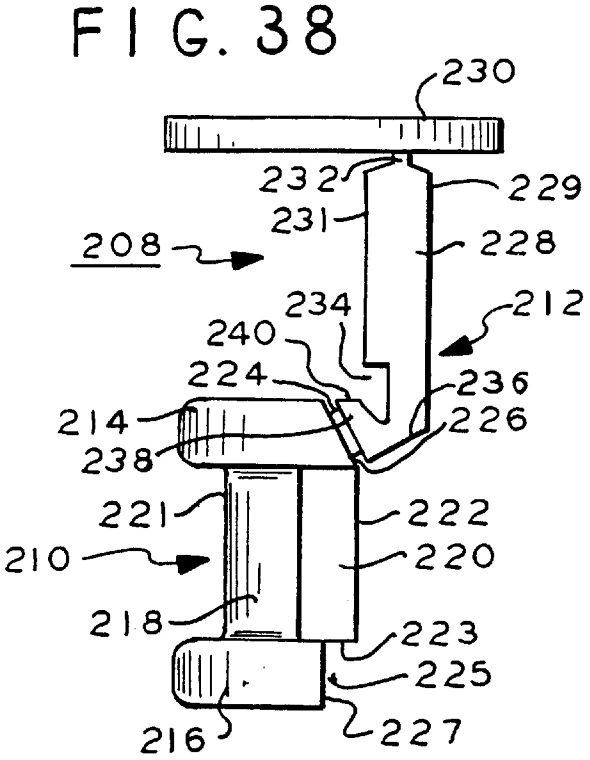
Figure 39:
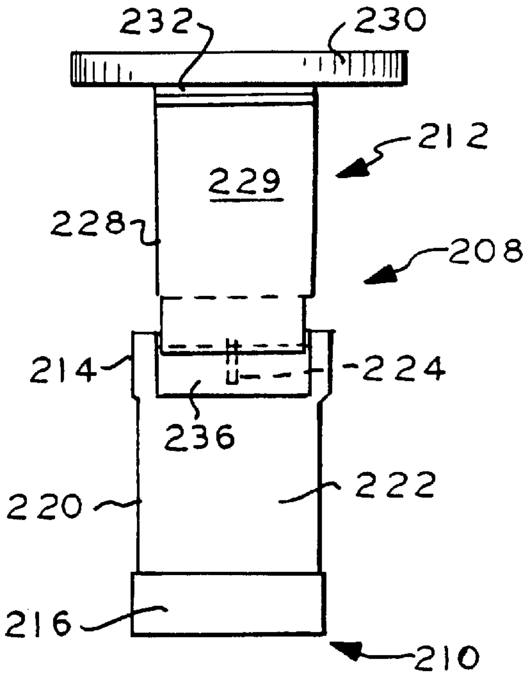
Figure 40:
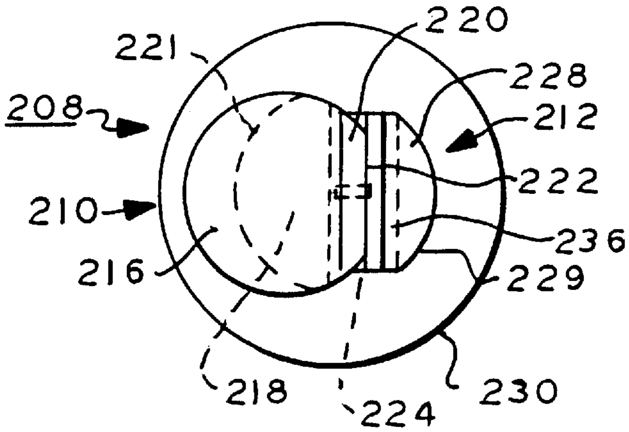

In FIGS. 33–36, the sequence for opening the seal 154 is shown. In FIG. 33, the top plate 184 of the locking element 158 is tilted in direction 205 breaking the web 186 since the element 158 and device 156 are locked stationary in place. In FIGS. 34 and 35, the element 158 is pushed down in direction 206 until it falls free of the bores 16 and 18. The hook 192, due to its lowermost location, readily releases from the locking recess 174. This releases the device 156 for translation to the right in FIG. 35 to align its legs in the bin and cover bores, permitting axial displacement of the device 156 from the bores in directions 207, FIG. 36.

A fifth embodiment of a seal 208 according to the present invention is shown in FIGS. 37–40. Molded one piece thermoplastic seal 208 includes a locking device 210 and a locking element 212. The device 210 has a pair of spaced circular cylindrical segment legs 214 and 216 and a central recessed segment 218 extending from body 220. The segment 218' has a front face 221 that is a circular cylindrical segment. The legs and segment 218 have the same diameter cylindrical surfaces with an offset central axis. The body 220 has a flat rear face 222 that terminates at shoulder 223. The leg 216 terminates at rear surface 227 offset from rear face 222 forming a notch 225. A thin web 224 attaches locking element 212 to the body 222 at the device body inclined surface 226.

Locking element 212 has a body 228 having a circular cylindrical rear face 229 and a flat front face 231. A circular cylindrical top plate 230 is attached to the body 228 by thin frangible web 232. The body 228 has a recess 234 in its front face 231 forming a resilient locking hook 236. Hook 236 has a locking tang 238 that extends toward the top plate 230. The tang 238 terminates at its tip 240 which is complementary to the notch 225.

In operation, the seal 208 is inserted into the bin and cover bores on axis 8 (FIG. 2) as in the prior embodiments. The element 212 is further displaced until the web 224 severs permitting the element to be further displaced adjacent to the device 210 to the insertion position with the faces 231 and 222 abutting. In this state and position, the tang 238 engages the notch 225 and locks thereto. The notch 225 prevents the tang 225 and thus the element 212 from being lifted out of the bores toward the top of the drawing figure. The top plate 230 overlies the bin cover and prevents the seal from being dropped through the bores toward the bottom of the figure.

When it is desired to open the seal 208, the top plate is displaced to fracture the web 232 between the plate 230 and the body 228 of the element 212. This permits the element to be displaced downwardly out of the bores (not shown in these figures). This in turn releases the device for displacement to the right in the figures and to be axially released from the bores along their axis 8 (FIG. 2).

It will be recognized by those of ordinary skill in this art that the rigid devices and releasable elements of the seals serve both to lock the bin 4 and cover 6 together as a robust C-shaped fastener to withstand high shock loads and to secure the locked bin and cover against tampering. In this regard, any attempt to remove the locking elements to dislodge the devices cause the weak connecting webs to be deformed or to be severed from the element body such as to give evidence of tampering.

It should be understood that the description is given by way of illustration and not limitation and that it is intended that the scope of the invention is as defined by the appended claims.

For example, the tangs may be located on the locking device and the mating recess may be formed in the element. Also other forms of locking detents may be provided. For example, a resilient tang or projection may be placed at the bottom of the element. The tang is compressed during insertion and then expands when it emerges from the bore and engages the bottom surface of the bin member, so it over lies a portion of the bin member. The plate prevents the element from being downwardly displaced and the projection prevents the element from being upwardly displaced without using a corresponding recess in the locking device. Still other locking arrangements may be devised by one of ordinary skill for locking the locking the element in place while providing selective release means to the element.

What is claimed is:

1. A seal and fastener for securing together a plurality of members with aligned bores comprising:

a locking device with opposing spaced legs, the device for insertion in a first direction into the aligned bores for securing the members together in a locking position in which position the device legs are juxtaposed with a portion of the members; and a locking element for insertion into the aligned bores of the members adjacent to the device for locking the device in the locking position;

the device being arranged and constructed so that the device is first inserted to an insertion position in the first direction and is then displaced in its entirety from the insertion position to the locking position in a direction transverse to the first direction in response to the insertion of the element.

2. The seal and fastener of claim 1 wherein the element and device are interconnected by a frangible web which fractures in response to the insertion of the device and element by an insertion force on said element.

3. The seal and fastener of claim 1 including release means secured to the locking element for selectively releasing the locked locking element.

4. The seal and fastener of claim 1 wherein the device is rigid.

5. The seal and fastener of claim 1 wherein the locking element has a camming surface for engagement with one of said members for displacing the device to the locking position during insertion of the locking element into said bores.

6. The seal and fastener of claim 1 wherein the locking device is generally C-shaped.

7. The seal and fastener of claim 1 wherein the device and element include cooperating means for locking the inserted element to the members and to the device in the first direction with the device locked.

8. The seal and fastener of claim 7 wherein the cooperating means for locking the element includes a locking recess in one of the locking device and element and a locking tang on the other of the device and element for locking engagement of the tang with the locking recess and a flange on the element for cooperating with the tang for locking the element to the device and members.

9. The seal and fastener of claim 8 wherein the locking element tang is resilient.

10. The seal and fastener of claim 1 wherein the device is C-shaped and includes a first body extending along an axis, the spaced legs extending transversely the body and axis, the first body for axial insertion into the aligned bores to the insertion position along the axis in the first direction, the legs for overlying and securing the members together in the device locking position.

11. The seal and fastener of claim 10 wherein the device is arranged for being displaced normal to the axis and relative to the insertion position to the locking position in response to insertion of the element.

12. The seal and fastener of claim 10 wherein the second body includes a flange projection releasably secured to the second body for cooperatively securing the members to the second body.

13. The seal and fastener of claim 10 wherein the second body has a camming surface for displacing the device from the first insertion position to the locking position in response to the insertion of the locking element to the second insertion position.

14. The seal and fastener of claim 10 wherein the tang locking recess is formed in a portion of the first body in a direction transverse said axis.

15. The seal and fastener of claim 10 wherein the tang locking recess has a tapered surface tapering relative to the insertion direction and a tang locking surface normal to the insertion direction, the tang extending inclined from the element relative to the insertion direction in a direction opposite the insertion direction, the tang for locking engagement with said normal surface.

16. The seal and fastener of claim 10 wherein the locking element comprises a second body, the first body having a tang locking recess, the second body including a tang extending therefrom for engaging the locking recess, the second body and tang being arranged to axially lock the element to the first body when the tang is engaged with the recess, the element being arranged for axial insertion into said aligned bores to a second insertion position adjacent to the device, the tang for engagement with the tang locking recess in the second position, the tang and second body for axially securing the locking element in said second insertion position and the device in the locking position.

17. The seal and fastener of claimed 16 wherein the projection comprises a flange secured to the second body by a reduced section to permit manual separation of the flange from the second body and for releasing the secured locking element.

18. The seal and fastener of claim 16 wherein the projection is secured to the second body with a weakened region for permitting the projection to be manually separated from the second body.

19. The seal and fastener of claim 18 wherein the locking element second body has opposing first and second ends, a projecting extending from the first end for overlying the members, and the camming surface being formed at the second end, the projection cooperating with the tang for securing the element to the device.

20. A locking seal and fastener comprising:

a generally C-shaped device having a body and spaced first and second legs extending from a first surface of the body, the device for insertion in a first direction into a pair of aligned bores to an insertion position in respective members to be secured, the legs for overlying a portion of the members in a locking position displaced transversely from the insertion position in the aligned bores, the device having a tang receiving recess with a second surface; and a locking element cooperating with the device for insertion into said aligned bores adjacent to said insertion position, the element including a first end with a flange, a second end distal the flange, and a tang for axial locking engagement with the tang receiving recess second surface to preclude withdrawal of the locking element in a direction opposite the first direction, the flange for precluding the element from passing through the aligned bores in the first direction.

21. The seal and fastener of claimed 20 including a reduced section between one of the flange and tang or between one of the element body and flange to permit the flange or tang to be selectively manually severed from the element and to permit the locking element and locking device to be released from said bores.

22. A seal and fastener for securing together a plurality of members with aligned bores comprising:

a C-shaped locking device with opposing spaced legs, the device for insertion in a first direction into the aligned bores for securing the members together in a locking position in which position the device legs are juxtaposed with a portion of the members; and a locking element for insertion into the aligned bores of the members adjacent to the device for locking the device in the locking position;

the device including a first body extending along an axis, the spaced legs extending transversely the body and axis, the first body for axial insertion into the aligned bores to the insertion position along the axis in the first direction, the legs for overlying and securing the members together in the device locking position.

23. A seal and fastener for securing together a plurality of members with aligned bores comprising:

a locking device with opposing spaced legs, the device for insertion in a first direction into the aligned bores for securing the members together in a locking position in which position the device legs are juxtaposed with a portion of the members; and a locking element for insertion into the aligned bores of the members adjacent to the device for locking the device in the locking position;

the locking element having a camming surface for engagement with one of said members for displacing the device to the locking position during insertion of the locking element into said bores.

24. A seal and fastener for securing together a plurality of members with aligned bores comprising:

a C-shaped locking device with opposing spaced legs, the device for insertion in a first direction into the aligned bores for securing the members together in a locking position in which position the device legs are juxtaposed with a portion of the members; and a locking element for insertion into the aligned bores of the members adjacent to the device for locking the device in the locking position.

* * * * *